J. W. IVORY.
PAD HOLDER FOR DENTAL PURPOSES.
APPLICATION FILED FEB. 27, 1911.
1,010,146. Patented Nov. 28, 1911.
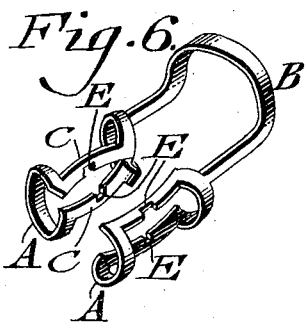
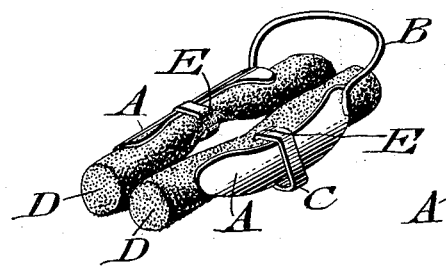
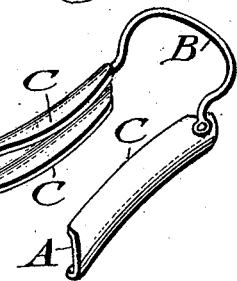
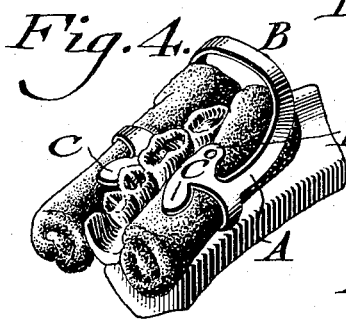
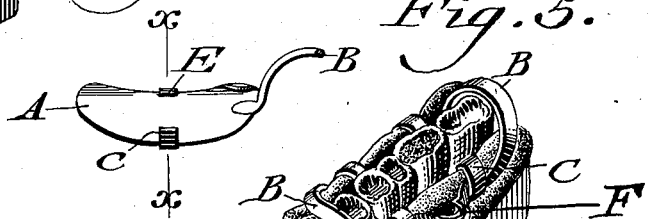
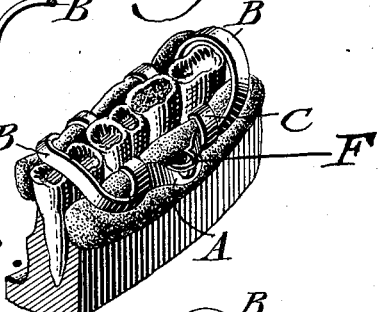
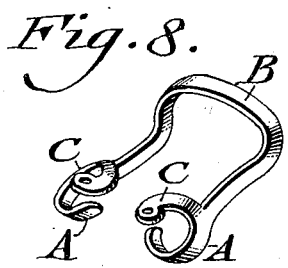
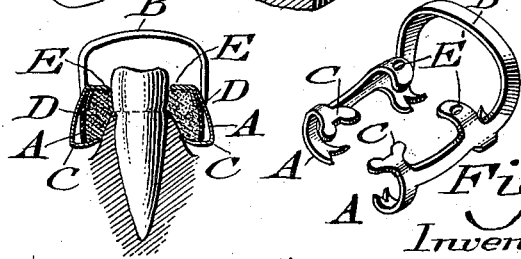

UNITED STATES PATENT OFFICE.

JAMES W. IVORY, OF PHILADELPHIA, PENNSYLVANIA.

PAD-HOLDER FOR DENTAL PURPOSES.

1,010,146.      Specification of Letters Patent.      Patented Nov. 28, 1911.

Application filed February 27, 1911. Serial No. 611,026.

*To all whom it may concern:*

Be it known that I, JAMES W. IVORY, a subject of the King of Great Britain, residing in the city and county of Philadelphia, State of Pennsylvania, have invented a new and useful Pad-Holder for Dental Purposes, of which the following is a specification.

My invention consists of means for holding a pad on a gum during a dental operation, so as to absorb saliva at or about the tooth.

For the purpose of explaining my invention the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a pad holder for dental purposes, including the pads embodying my invention. Fig. 2 represents a central longitudinal section thereof, the pads being removed. Fig. 3 represents a transverse section thereof on line *x—x* Fig. 2, showing the device in position on the tooth. Fig. 4 represents a perspective view of another form of a pad holder embodying my invention. Fig. 5 represents a perspective view of another form of a pad holder embodying my invention. Fig. 6 represents a perspective view of another form of a pad holder embodying my invention. Fig. 7 represents a perspective view of another form of a pad holder embodying my invention. Fig. 8 represents a perspective view of another form of a pad holder embodying my invention. Fig. 9 represents a perspective view of another form of a pad holder embodying my invention. Fig. 10 represents a perspective view of another form of a pad holder embodying my invention.

Similar letters of reference indicate corresponding parts in the figures.

Referring to the drawings, A designates jaws which are connected at one end by the resilient bow or bridge B suitably attached thereto. Said jaws are concave on their inner sides the concavities facing each other. Surrounding the jaws in transversely-extending direction are the resilient clamps C whose inner portions are separated and sufficiently large to receive between them the pads D of absorbent material, the terminals of the inner side portions of the clamps having thereon the inturned or overhanging lips or spurs E which are adapted to embrace and pierce said pads and so take firm hold thereof. The jaws are composed of plates slightly convex on their inner faces and sufficiently long to form proper bearings or supports for the major portions of the pads D, while the other portions thereof are embraced by the clamps C, as most plainly shown in Fig. 1. It will be seen that the jaws may be separated and the pads fitted over the teeth to be operated upon, and held firmly on the gum so as to absorb the saliva in proximity thereto, it being noticed that owing to the resilient bow or bridge B, the device may be easily applied and adjusted in position and firmly held by pressure of the bow B without liability of displacement until it is properly manipulated for the purpose of removal, it being evident that the pads are securely retained on the jaws before application of the device to a tooth, during an operation thereon and after removal therefrom.

In several of the figures the jaws and clamps are shown integral and of various configurations.

In Figs. 4, 6, 8, 9, and 10 the clamps are provided with openings E′ to receive the bills of forceps for handling, applying, adjusting and removing the devices. In Fig. 5 the jaws are connected at opposite ends by the bows B and the jaws have lateral offsets F for the reception of the bills of forceps for purposes similar to the openings E′. In said Figs. 4, 5, 6, 8, 9, and 10, the jaws are of skeleton form for the purpose of lightness and saving of metal or material.

In Fig. 7 the jaws A are concaved to such extent that their upper and lower portions form inturned lips or clamps C which with said jaws receive and retain the pads.

I may employ an instrument for carrying, adjusting and removing a pad holder, it being of the form of forceps having bills or tines that may be applied to the device so as to carry it into the mouth, fit it over the desired teeth and adjust it in position, and afterward remove it, attention being directed to the fact that the forceps are adapted to engage the jaws and rolls or pads, or both, and open laterally so as to separate the jaws for the purpose intended of the forceps, the effect of which is evident.

Having thus described my invention what

I claim as new and desire to secure by Letters Patent, is:—

1. A device for the purpose stated composed of concaved jaw members, and means for resiliently connecting said members, the concavities of said members facing inwardly and toward each other.

2. A device for the purpose stated, composed of concaved jaw members, means for resiliently connecting said members, and inturned lips on the inner side terminals of said members, the concavities of said members and the terminals of said lips facing inwardly and toward each other.

3. A pad holding device of the character stated composed of jaws, means for resiliently joining the same and inturned lips on the inner side terminals of said jaws, the jaws being of skeleton form and concaved inwardly toward each other.

4. A pad holding device of the character stated composed of jaws, means for resiliently joining said jaws and inturned lips on the inner side terminals of said jaws, said jaws having an implement-engaging opening therein.

JAMES W. IVORY.

Witnesses:
C. D. McVay,
N. Bussinger.

Copies of this patent may be obtained for five cents each, by addressing the "Commissioner of Patents, Washington, D. C."